United States Patent
Wong et al.

(10) Patent No.: US 9,571,953 B2
(45) Date of Patent: Feb. 14, 2017

(54) METHODS AND SYSTEMS FOR IMPLEMENTING A REPETITION LEVEL FOR A CHANNEL

(71) Applicant: ALCATEL LUCENT, Paris (FR)

(72) Inventors: Shin Horng Wong, Chippenham (GB); Matthew Baker, Canterbury (GB); Sigen Ye, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 204 days.

(21) Appl. No.: 14/068,192

(22) Filed: Oct. 31, 2013

(65) Prior Publication Data

US 2015/0117233 A1  Apr. 30, 2015

(51) Int. Cl.

| | |
|---|---|
| *H04W 72/04* | (2009.01) |
| *H04W 74/08* | (2009.01) |
| *H04W 4/00* | (2009.01) |
| *H04W 72/02* | (2009.01) |
| *H04L 1/08* | (2006.01) |
| *H04W 74/00* | (2009.01) |

(52) U.S. Cl.
CPC .............. *H04W 4/005* (2013.01); *H04L 1/08* (2013.01); *H04W 72/02* (2013.01); *H04W 72/042* (2013.01); *H04W 74/08* (2013.01); *H04W 74/0833* (2013.01); *H04W 74/006* (2013.01)

(58) Field of Classification Search
None
See application file for complete search history.

(56) References Cited

U.S. PATENT DOCUMENTS

| | | | |
|---|---|---|---|
| 2008/0194259 A1* | 8/2008 | Vujcic et al. | 455/435.1 |
| 2009/0305693 A1 | 12/2009 | Shimomura et al. | |
| 2010/0069037 A1* | 3/2010 | Fischer et al. | 455/410 |
| 2010/0172299 A1* | 7/2010 | Fischer | H04W 74/0866 370/328 |
| 2011/0222492 A1* | 9/2011 | Borsella | H04W 74/002 370/329 |
| 2012/0004002 A1* | 1/2012 | Nanri et al. | 455/509 |
| 2015/0016312 A1* | 1/2015 | Li | H04W 74/0833 370/280 |
| 2015/0043445 A1* | 2/2015 | Xiong et al. | 370/329 |
| 2015/0078264 A1* | 3/2015 | Han et al. | 370/329 |

FOREIGN PATENT DOCUMENTS

EP    2187547 A1    5/2010

OTHER PUBLICATIONS

International Search Report and Written Opinion dated Mar. 19, 2015.

\* cited by examiner

*Primary Examiner* — Duc Duong
(74) *Attorney, Agent, or Firm* — Harness, Dickey & Pierce, P.L.C.

(57) ABSTRACT

At least one example embodiment discloses a user equipment (UE) including a memory configured to store a selected physical random access channel (PRACH) repetition level and a processor configured to monitor a duration of a timer, the duration indicating a length of time to use the PRACH repetition level.

12 Claims, 3 Drawing Sheets

METHODS AND SYSTEMS FOR IMPLEMENTING A REPETITION LEVEL FOR A CHANNEL

BACKGROUND

Current wireless cellular systems are designed to serve user terminals and their applications, in order to allow the continuous streaming of data (e.g., voice and/or video) during a communications session. For these types of applications, when a communications link between a user terminal and a base station is enabled, the communications link is expected to last for a relatively long period of time. Additionally, setting up one or more channels for a communications link between a mobile terminal and a base station may require the mobile terminal and the base station to send and receive various control and signaling data prior to starting a streaming session (e.g. signaling procedures for traffic channel access). Once the communications link is established, other signaling protocols, such as scheduling protocols, may be used to avoid signal interference with other data transmissions. Furthermore, even when a user terminal enters an "idle mode" (i.e., when no data is being transmitted) in order to reduce the amount of signaling that takes place during a communications session, the user terminal may be required to send and receive various control and signaling data prior to entering an "connected mode." These control and signaling procedures may require a substantial amount of network resources.

A Machine Type Communication (MTC) device is a UE that is used by a machine for a specific application. An example of an MTC device is smart utility meter. Some of these smart meters are located in basements, which suffer from high penetration loss. Therefore, it is difficult for the MTC device to communicate with the network.

In 3GPP, a coverage enhancement is proposed for MTC UEs. The coverage enhancement aims at extending the coverage of an MTC UE, which may be referred to as a CE-MTC UE (Coverage Enhanced MTC UE).

Repetition may be used for a CE-MTC UE. The term repetition level may refer to a number of repetitions for the PRACH. The repetition level allows the MTC UE at different coverage levels to use a different number of repetitions.

The physical random access channel (PRACH) is one of the physical channels that uses coverage enhancement for a CE-MTC UE.

SUMMARY

There may be multiple repetition levels for the PRACH and the repetition levels are configurable by an eNB. The eNB can estimate the MTC UE uplink coverage, e.g., based on the physical uplink shared channel (PUSCH) quality or hybrid automatic repeat request (HARQ) retransmission. In this way, the MTC UE selects the repetition level for non-initial PRACH access, i.e., subsequent PRACH transmission while still in a connected mode. However, it is not possible to configure the MTC UE on an initial access, e.g., when the device is first switched on, or when the device initiates the connection from an idle mode. Furthermore, subsequent PRACH access after the initial access while the UE is still connected is not expected to occur frequently.

At least some example embodiments relate to methods and systems for implementing a physical random access channel (PRACH) by a user equipment (UE) using a selected repetition level. More specifically, a timer may be used which indicates a length of time a repetition level is to be used by the MTC UE.

At least one example embodiment discloses a user equipment (UE) including a memory configured to store a selected physical random access channel (PRACH) repetition level and a processor configured to monitor a duration of a timer, the duration indicating a length of time to use the PRACH repetition level.

In an example embodiment, the processor is configured to perform PRACH access using the stored PRACH repetition level before the timer expires.

In an example embodiment, the UE further includes a transmitter configured to transmit the PRACH using the stored PRACH repetition level and a receiver configured to receive a response to the PRACH, wherein the processor is configured to adjust the stored PRACH repetition level based on the response.

In an example embodiment, the receiver is configured to receive an indicator of a number of repetitions and the processor is configured to adjust the stored PRACH repetition level based on the indicator.

In an example embodiment, the receiver is configured to receive a broadcast indicating a number of repetitions.

In an example embodiment, the indicator is an offset relative to the previously stored repetition level and the processor is configured to adjust the stored PRACH repetition level according to the offset.

In an example embodiment, the processor is configured to increase the stored PRACH repetition level until the receiver receives the response.

In an example embodiment, the processor is configured to start the timer if the stored PRACH repetition level is adjusted according to a received indicator of a number of repetitions.

At least one example embodiment discloses a method of implementing a physical random access channel (PRACH) repetition level for a user equipment (UE). The method includes obtaining, by the UE, a selected PRACH repetition level monitoring, by the UE, a duration of a timer, the duration indicating a length of time to use the selected PRACH repetition level and performing PRACH access using the selected PRACH repetition level before the timer expires.

In an example embodiment, the method further includes receiving an indicator of a number of repetitions and adjusting the selected PRACH repetition level based on the indicator.

In an example embodiment, the receiving includes receiving a broadcast including the indicator.

In an example embodiment, the indicator is an offset relative to the previously stored repetition level and the processor is configured to adjust the stored PRACH repetition level according to the offset.

In an example embodiment, the method further includes starting the timer when the selected PRACH repetition level is adjusted according to a received number of repetitions.

At least one example embodiment discloses a method of transmitting a physical random access channel (PRACH) by a user equipment (UE) using a selected repetition level. The method includes transmitting the PRACH using a first value repetition level, obtaining a duration of a timer, the duration indicating a length of time to use the selected repetition level and transmitting the PRACH using the selected repetition level.

In an example embodiment, the duration of the timer is one of fixed and received by the UE from a base station.

In an example embodiment, the method further includes determining whether the timer has expired, transmitting the PRACH using a second value repetition level as the selected repetition level if the time has not expired and transmitting the PRACH using a third value repetition level as the selected repetition level if the timer has expired.

In an example embodiment, the second value of repetition level is one of the first value repetition level and a value received by the UE from a base station.

In an example embodiment, the method further includes determining the first value repetition level, the determining including obtaining a reference signal received power (RSRP) by the UE, determining whether the RSRP exceeds a threshold and determining the first value repetition level based on whether the RSRP exceeds a threshold.

In an example embodiment, the method further includes starting the timer, wherein the timer is started at at least one of a transmission time of the PRACH prior to receiving an acknowledgement, receiving an acknowledgement, receiving information indicating a length of time of the timer and receiving information indicating a PRACH repetition level.

At least one example embodiment discloses a method of implementing a physical random access channel (PRACH) repetition level for a user equipment (UE). The method includes transmitting information to the UE, the information indicating at least one of (1) a duration of a timer, the duration indicating a length of time to use a PRACH repetition level, and (2) a PRACH repetition level to be used during the duration of a timer.

BRIEF SUMMARY OF THE DRAWINGS

Example embodiments will be more clearly understood from the following detailed description taken in conjunction with the accompanying drawings. FIGS. 1-3B represent non-limiting, example embodiments as described herein.

FIG. 1 illustrates an example of a communications network, according to an example embodiment;

FIG. 2 illustrates a method of implementing a physical random access channel (PRACH) repetition level for an MTC UE, according to an example embodiment;

FIG. 3B illustrates an example embodiment of the network control entity (e.g., a base station) in FIG. 1.

DETAILED DESCRIPTION

Figure 1:
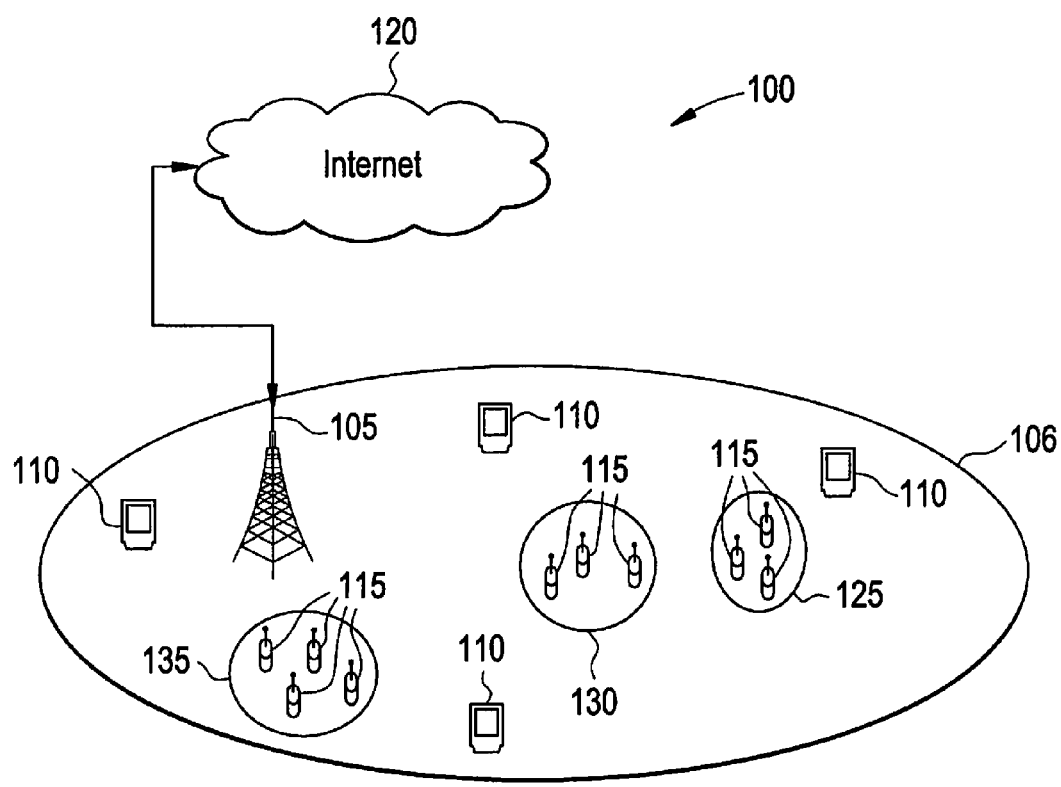

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. For example, program modules and functional processes discussed herein may be implemented using existing hardware at existing network elements or control nodes (e.g., the base stations and MTC UEs illustrated in FIG. 1). Such existing hardware may include one or more processors, digital signal processors (DSPs), application-specific-integrated-circuits, field programmable gate arrays (FPGAs) computers or the like.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile terminal" may be considered synonymous to, and may hereafter be occasionally referred to, as a client, mobile, user terminal, mobile unit, mobile station, mobile user, user equipment (UE), subscriber, user, remote station, access agent, user agent, receiver, etc., and may describe a remote user of network resources in a communications network. Furthermore, the term "mobile terminal" may include any type of wireless/wired device such as consumer electronics devices, smart phones, tablet personal computers, personal digital assistants (PDAs), desktop computers, and laptop computers, for example.

As used herein, the term "network element", may be considered synonymous to and/or referred to as a networked computer, networking hardware, network equipment, router, switch, hub, bridge, gateway, or other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. The term "network element", may be considered synonymous to and/or referred to as a "base station". As used herein, the term "base station", may be considered synonymous to and/or referred to as an enhanced or evolved Node B (eNB), base transceiver station (BTS), NodeB, access point (AP), etc. and may describe equipment that provides the radio baseband functions for data and/or voice connectivity between a network and one or more users.

Example embodiments may be utilized in conjunction with radio access networks (RANs) such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (Wi-MAX); ultra mobile broadband (UMB); $3^{rd}$ Generation Partnership Project LTE (3GPP LTE); and $4^{th}$ Generation LTE.

FIG. 1 illustrates an example of a communications network, according to an example embodiment. A communications network 100 includes a base station 105, a cell coverage area 106, internet 120, MTC device group 125, MTC device group 130, MTC device group 135, mobile terminals 110, and Machine Type Communications (MTC) UEs 115.

The base station 105 may be configured to provide wireless communication services to mobile terminals within a geographic area, or cell coverage area, associated with the base station 105.

For example, FIG. 1 shows mobile terminals 110 and MTC devices 115 within the cell coverage area 106 provided by the base station 105. The base station 105 may provide wireless communication services to mobile terminals 110 and/or MTC UEs 115 via a link for each user terminal and/or MTC UE. Links between base station 105 and each of the mobile terminals 110 and MTC UEs 115 may include one or more downlink (or forward) channels for transmitting information from base station 105 to mobile terminals 110 and MTC UEs 115 and one or more uplink (or reverse) channels (e.g., PRACH) for transmitting information from mobile terminals 110 and MTC UEs 115 to the base station 105.

The base station 105 may include a processor and transmitter/receiver connected to one or more antennas and an electronic switching function. The one or more transmitters/receivers may be configured to transmit/receive data signals to/from one or more user terminals within its cell coverage area (e.g., mobile terminals 110 and MTC UEs 115) via one or more links that may be associated with a transmitter and a receiver. In various embodiments, the base station 105 may employ an Evolved Node B, (also known as an eNodeB or eNB) to connected with, or otherwise communicate with, mobile terminals (e.g., mobile terminals 110) within the base station 105's cell coverage area (e.g., cell coverage area 106).

The base station 105 may be configured to employ one or more wireless communications standards, such as CDMA, GSM, LTE, WiMAX, or other like wireless communications standard. The base station 105 may also be configured to connect to a service provider's network via hard link, such as a packet switched network, a mobile switching center, or via other like connection means. The electronic switching function may be a "Mobile Switching Center" (MSC) when base station 105 employs a GSM, AMPTS, NMT and CDMA system. Alternatively, a "Media Gateway" (MGW)/ "Gateway MSC Server" (GMSC) may be used if base station 105 employs a 3G/4G mobile system. In various embodiments, the aforementioned functions may be provided by separate components or devices.

In various embodiments, where the base station 105 uses the LTE wireless communication protocol, the base station 105 may comprise components of the System Architecture Evolution (SAE) with an Evolved Packet Core (EPC) as described by the 3rd Generation Partnership Project (3GPP). In such embodiments, the base station 105 may include components such as a Mobility Management Entity (MME), Serving Gateway (SGW), PDN Gateway (PGW), Home Subscriber Server (HSS), Access Network Discovery and Selection Function (ANDSF), Evolved Packet Data Gateway (ePDG), and/or other like components as are known. In various embodiments, the aforementioned components may be employed by separate devices.

The base station 105 may be configured to operate a channel access method, such as code division multiple access (CDMA), orthogonal frequency-division multiple access (OFDMA), frequency division multiple access (FDMA), single-carrier FDMA (SC-FDMA), time division multiple access (TDMA), packet mode multiple-access, space division multiple access (SDMA), or other like channel access methods or combination thereof.

The base station 105 may also be configured to operate a scheduling algorithm, such as proportional fair, maximum throughput scheduling, or other like scheduling algorithms as is known. The scheduling algorithm may describe a schedule for allocating network resources for every device with the base station 105's cell coverage area (e.g. cell coverage area 106), such that each transmission is assigned to a carrier frequency at a time instant.

The base station 105 may be configured to operate a collision detection method, such as a carrier sense multiple access (CSMA) protocol, which is a probabilistic Media Access Control (MAC) protocol in which a device verifies the absence of other traffic before transmitting on a shared transmission medium. The CSMA protocol may employ a collision avoidance (CA) protocol, in which a device only transmits when a channel is sensed to be idle. Alternatively, the CSMA protocol may employ a collision detection (CD) protocol, in which a device terminates a transmission as soon as a collision is detected. However, embodiments are not limited to the collision detection methods described above and may encompass any type of collision detection method. Additionally, the CSMA protocol may be enhanced with a Request-to-Send/Clear-to-Send (RTS/CTS) protocol, in which a device wishing to send data initiates the process by sending a request to send frame (RTS) and the destination device replies with a clear to send frame (CTS).

Each of the mobile terminals 110 may include a transceiver, memory, and processor. The mobile terminals 110 may be configured to send/receive data to/from the base station 105. The mobile terminals 110 may be designed to sequentially and automatically carry out a sequence of arithmetic or logical operations; equipped to record/store digital data on a machine readable medium; and transmit and receive digital data via the base station 105. The mobile terminals 110 may include wireless phones, laptop personal computers, tablet personal computers, and/or any other physical or logical device capable of recording, storing, and/or transferring digital data via the base station 105. Each of the mobile terminals 110 may include a wireless transceiver configured to operate in accordance with the IEEE 802.11-2007 standard (802.11) or other like wireless standards.

The MTC UEs 115 may be mobile terminals or any device that requires little (or no) human intervention to communicate with another device (e.g., the base station 105). It should be noted that Machine Type Communications may also be referred to as Machine-to-Machine (M2M) communications, and thus, MTC UEs 115 may also be referred to as M2M devices. The MTC UEs 115 may be sensors, meters, or other like devices that can capture and/or record an event (e.g., temperature, electrical output, water usage, inventory level, and the like). Once an event is captured and recorded, such an event may be relayed through a network (e.g., internet 120 via base station 105) and reported to an application or software program. The application or software program may use the captured event to take an appropriate action (e.g., reduce or increase temperature, restock inventory items, and the like).

Therefore, the MTC UEs 115 may be configured to transmit data associated with one or more captured events autonomously or with little to no human intervention (i.e., "reporting"). The MTC UEs 115 may also be configured to receive data requests. The MTC UEs 115 may also be configured to be re-configured autonomously, such that MTC devices may re-configure themselves by receiving control data (e.g., receiving control data from base station 105 or from an application via base station 105). Accordingly, each of the MTC UEs 115 may include a wireless transceiver configured to operate in accordance with the IEEE 802.11-2007 standard (802.11) or other like wireless standards.

The MTC UEs 115 may also be a part of a MTC device group (e.g., MTC device group 125, MTC device group 130, or MTC device group 135). The MTC UEs 115 may be grouped according to an application type. For example, the MTC UEs 115 within one of MTC device groups 125 may report metered data such as electricity usage, whereas MTC UEs within one of MTC device group 130 may report inventory levels. MTC device groups may also be based on MTC UEs having the same or similar data reporting times, the same or similar reporting period or cycle, and/or the same or similar maximum data report size. The MTC UEs 115 may also be grouped according to device type (e.g., temperature meter, electrical meter, and the like).

The base station 105 of an MTC UE 115 may configure a repetition level for the MTC device UE 115 to extend the coverage of the MTC UE 115 so the MTC may transmit the extended coverage of the PRACH.

Figure 2:
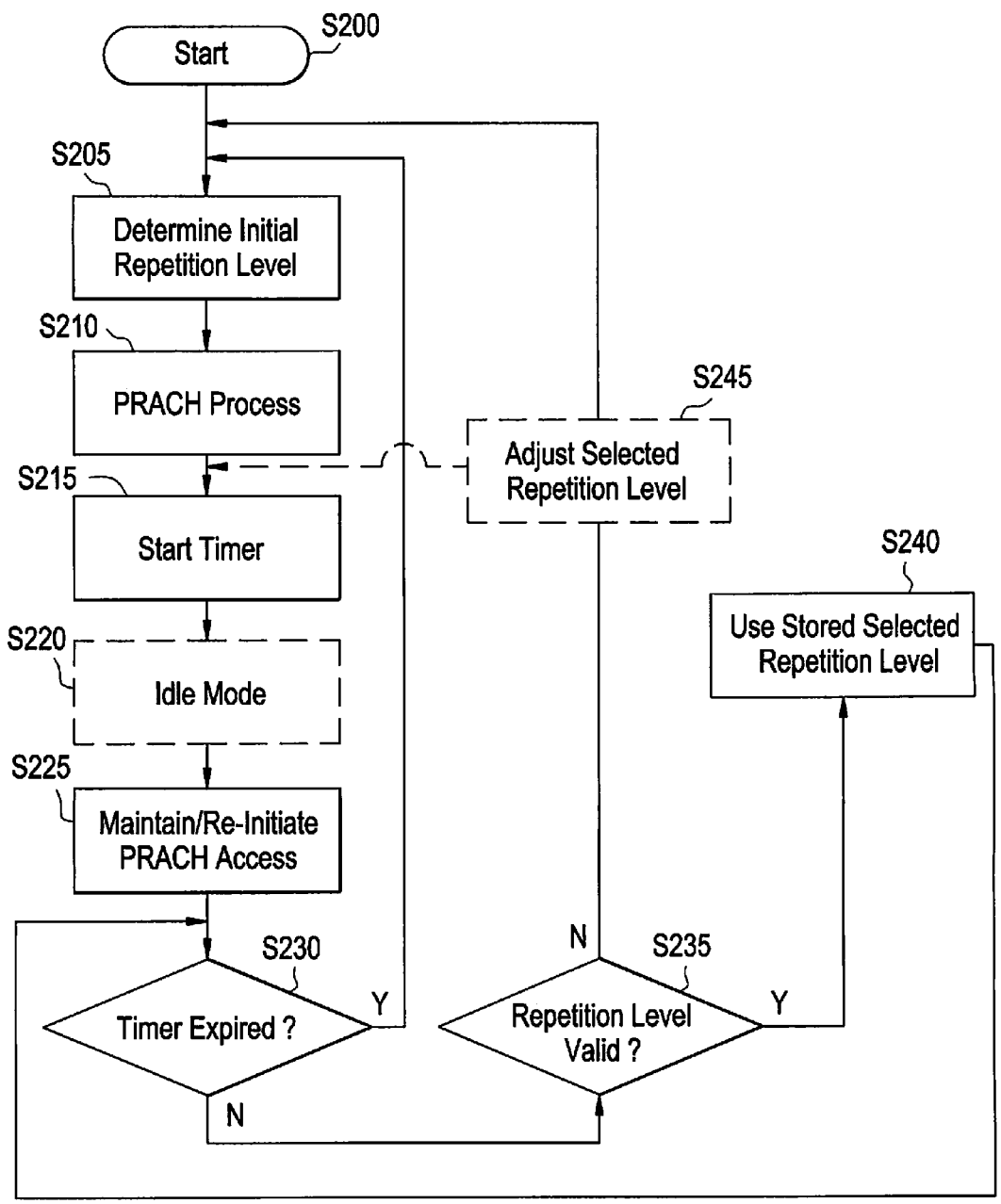

FIG. 2 illustrates a method of implementing a physical random access channel (PRACH) repetition level for a user equipment (UE) and for transmitting the physical random access channel (PRACH) by the UE, according to an example embodiment. During the description, a repetition level being used by an MTC UE may be referred to as a selected repetition level.

At S200, the method starts. At S205, an MTC UE determines an initial repetition level. The MTC UE may determine the initial repetition level in various ways. In an example embodiment, the MTC UE measures a reference signal received power (RSRP) from the base station. A range (or threshold) of RSRP is defined for each repetition level. When the MTC UE determines that the RSRP exceeds a threshold (or falls within a range), the MTC UE sets the associated repetition level as the initial repetition level. The RSRP range (or threshold) may be determined by the MTC UE or base station based on any number of network factors (e.g., load, priority) or empirical data.

In another example embodiment, the MTC UE determines the initial repetition level by transmitting PRACH preambles at an initial repetition level. The initial repetition level may be signaled from the base station to the MTC UE, determined by the MTC UE from the measured RSRP or determined by the MTC UE based on network specifications and/or empirical data. The RSRP is measured by the MTC UE and compared against the range. The range of RSRP is sent by the base station. The MTC UE continues to increase the repetition level until the MTC UE receives a Random Access Response (RAR) from the base station. The available repetition levels are broadcast by the network/base station. Consequently, the MTC UE knows the available repetition levels prior to transmitting PRACH.

When the MTC UE receives the RAR, the MTC UE sets the repetition level associated with the PRACH preamble that resulted in the RAR, as the initial repetition level.

In another example embodiment, the RSRP-based repetition level selection and incrementation-based repetition level selection are combined. The MTC UE measures the RSRP, identifies the highest available repetition level of the PRACH that corresponds to a higher RSRP than the measured RSRP, transmits the PRACH with the associated repetition level, and, if no RAR is received by the MTC UE, the MTC UE selects the next higher PRACH repetition level and transmits the PRACH with the higher repetition level. The MTC UE continues to increase the repetition level until a RAR is received or a highest available repetition level is reached.

Once the MTC UE determines the initial repetition level, the MTC UE transmits the PRACH repetitions and executes a RACH process (executes PRACH transmission), thereby connecting to the base station at S210. Once the MTC UE is connected to the base station, the base station may configure a repetition level for this MTC UE. The repetition level configured by the base station for the MTC UE may be different than the initial repetition level.

The selected repetition level used by the MTC UE during and after S210 may be referred to as a first value repetition level, which may be the initial repetition level or different level configured by the base station.

At S215, the UE starts a timer. While the example embodiment of FIG. 2 illustrates that the UE starts the timer after the PRACH process, it should be understood that the timer may be started by the UE after receiving a RAR in response to a PRACH preamble, upon receiving an acknowledgment from the base station, upon receiving an indication from the base station indicating a length of time for the timer, or upon receiving information indicating a repetition level to use from the base station, for example.

In an example embodiment, the timer may be set to infinity, meaning that the timer will never expire.

Until the timer expires, the MTC UE uses either the selected repetition level that resulted in the RAR reception, the selected repetition level configured by the base station (during a previous connection or after successful PRACH preamble transmission) or the selected repetition level that resulted in the previous successful PRACH preamble transmission.

In at least one example embodiment, the timer continues to run when the MTC UE moves into an idle mode (as shown in S220) or a Timing Advance Timer (TAT) expires. Therefore, the selected repetition level that resulted in the RAR reception, the selected repetition level configured by the base station (during a previous connection or after successful PRACH preamble transmission) or the selected repetition level that resulted in the previous successful PRACH preamble transmission, can be used. At S225, the base station may re-configure the MTC UE repetition level when the CE-MTC UE is connected. If the base station reconfigures the MTC UE repetition level, the MTC UE may restart the timer. It should be understood that the base station can re-configure the MTC UE repetition level when the CE-MTC UE is connected at S225. If the base station reconfigures the MTC UE repetition level, the MTC UE may restart the timer.

The duration of the timer can be signaled to the MTC UE by the base station or the duration of the timer can be broadcast in a system information block (SIB), or programmed into the MTC UE based on existing standards. As described, the timer can be applied to both the initial access when the MTC UE is in idle mode and the random access when the MTC UE is in connected mode. The use of the timer recognizes that MTC UEs are likely to be stationary, and therefore, the channel conditions are not likely to change significantly once a selected PRACH preamble repetition level has been identified.

At S230, the MTC UE monitors the timer and determines whether the timer is expired. If the timer expires at S230, the method returns to S205 and the MTC UE will use the PRACH repetition selection process described above with regards to S205-S215. It should be understood that the UE may use the stored selected repetition level as the initial repetition level to transmit the PRACH in S205. If no RAR is received, the MTC UE may use a next higher PRACH repetition level to transmit PRACH and continue to increase the repetition level until a RAR is received or the highest repetition level is reached. As stated above, the highest repetition level is broadcasted by the network/base station.

At S235, the MTC UE determines whether the selected repetition value is still valid. In one example embodiment, the MTC UE will be informed, e.g., via paging, if there is a change to a SIB. The SIB indicates the resources where the MTC UE can transmit the PRACH preamble repetitions. The base station may change these resources, which may affect the number of repetitions in a repetition level, after the base station has configured the MTC UE for a specific repetition level and the timer has not expired.

When the MTC UE makes a PRACH attempt, the MTC UE checks whether the number of repetitions in the previously configured repetition level is valid, i.e. the changes to the SIB may also change the set of the valid numbers of repetitions. If the number of repetitions is valid then the MTC UE will use the stored selected repetition level (the selected repetition level that resulted in the RAR reception or the selected repetition level that resulted in the previous successful PRACH preamble transmission) at S240.

Additionally, the base station may signal to the MTC UE to stop the timer. This gives the base station the flexibility to force the MTC UE to restart the PRACH repetition level selection process. The signal to stop the MTC UE timer can be broadcasted to a group of MTC UEs or all MTC UEs in a cell.

If UE determines that the repetition level is not valid, the method may proceed to S205.

In another embodiment, the MTC UE adjusts the selected repetition level at S245. As an example, the MTC UE uses a next available repetition level that is higher than the stored selected repetition level. Furthermore, the MTC UE may select a repetition number if the repetition number is within an offset of a number of repetitions of the previously selected repetition level. Otherwise, the MTC UE restarts the PRACH process at S205. The offset can be signaled to the MTC UE via SIB or RRC configuration.

Once the MTC UE adjusts the selected repetition level, the MTC UE stores the adjusted selected repetition level and restarts the timer at S215.

Figure 3A:
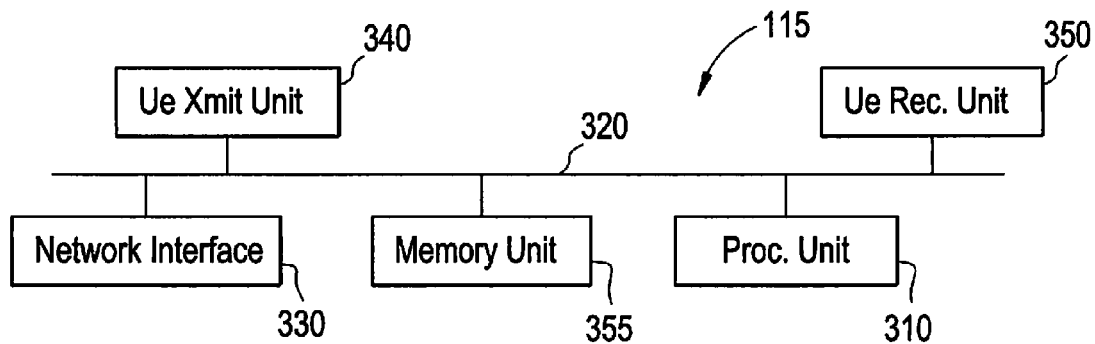
FIG. 3A illustrates an example embodiment of the MTC UE in FIG. 1.

FIG. 3A illustrates the components of a MTC UE 115 that may be employed by a communication network according to an example embodiment.

As shown, the MTC UE 115 includes a central processing unit 310, bus 320, network interface 330, transmitter 340, receiver 350, and memory 355. During operation, the memory 355 includes an operating system and a timer. The memory 355 is configured to store the selected repetition level and the duration of the time. In some embodiments, the MTC UE 115 may include many more components than those shown in FIG. 3A. However, it is not necessary that all of these generally conventional components be shown in order to disclose the illustrative embodiment.

The memory 355 may be a computer readable storage medium that generally includes a random access memory (RAM), read only memory (ROM), and a permanent mass storage device, such as a disk drive, for example. Software components may also be loaded from a separate computer readable storage medium into the memory 355 using a drive mechanism (not shown). Such separate computer readable storage medium may include a floppy drive, disc, tape, DVD/CD-ROM drive, memory card, or other like computer readable storage medium (not shown). In some embodiments, software components may be loaded into the memory 355 via the network interface 330, rather than via a computer readable storage medium. The loaded software components may be executed by the central processing unit 310.

The central processing unit 310 may be configured to carry out instructions of a computer program by performing the basic arithmetical, logical, and input/output operations of the system. Instructions may be provided to the central processing unit 310 by the memory 355 via the bus 320. The central processing unit 310 is configured to monitor a duration of the timer, perform PRACH access using the stored PRACH repetition level before the timer expires and adjust the stored PRACH repetition level, as described in FIG. 2.

The bus 320 enables the communication and data transfer between the components of the MTC UE 115. The bus 320 may comprise a high-speed serial bus, parallel bus, storage area network (SAN), and/or other suitable communication technology.

The network interface 330 is a computer hardware component that connects the MTC UE 115 to a computer network. The network interface 330 may connect the MTC UE 115 to a computer network via a wired or wireless connection.

The timer may be any type of hardware, software, or hardware/software combination used for measuring time intervals. The timer may be configured to increment or decrement a digital counter at a fixed frequency.

The transmitter 340 may be any type of hardware device that may generate, or otherwise produce, radio waves in order to communicate with one or more other devices. The transmitter 340 may be coupled with an antenna (not shown) in order to transmit data to one or more other devices. The transmitter 340 is configured to transmit the PRACH using the stored PRACH repetition level.

The receiver 350 may be any type of hardware device that can receive and convert a signal from a modulated radio wave into usable information, such as digital data. The receiver 350 may be coupled with an antenna (not shown) in order to capture radio waves. The receiver 350 is configured to receive a response to the PRACH.

In various embodiments, a transceiver (not shown) may be included with MTC UE 115. A transceiver may be a single component configured to provide the functionality of transmitter 340 and receiver 350 as discussed above.

Figure 3B:
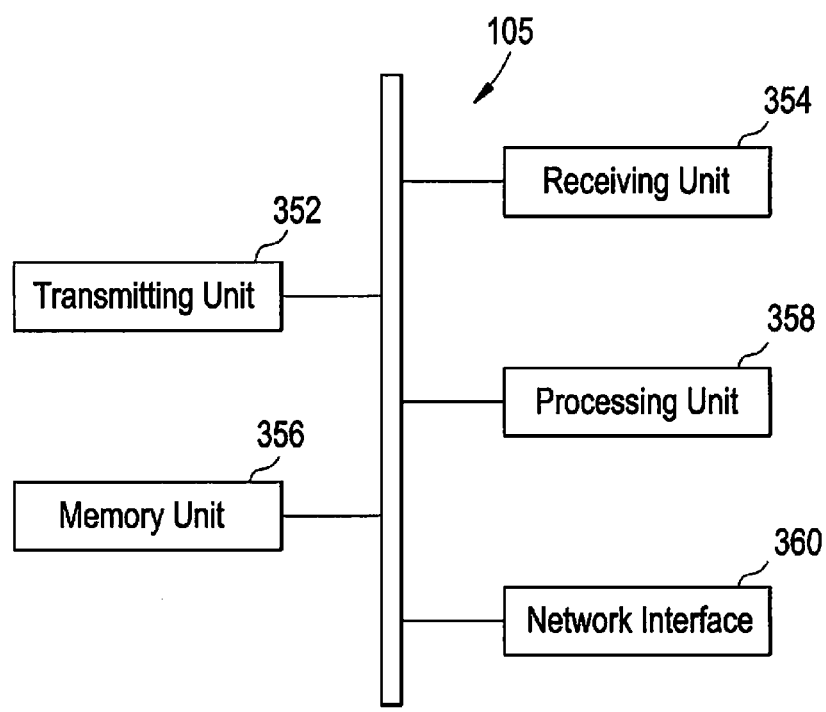

FIG. 3B illustrates an example embodiment of a network entity such as the base station 105. It should be also understood that the base station 105 may include features not shown in FIG. 3B and should not be limited to those features that are shown.

Referring to FIG. 3B, the base station 105 may include, for example, a data bus 359, a transmitting unit 352, a receiving unit 354, a memory unit 356, a processing unit 358 and a network interface 360.

The transmitting unit 352, receiving unit 354, memory unit 356, network interface 360 and processing unit 358 may send data to and/or receive data from one another using the data bus 359. The transmitting unit 352 is a device that includes hardware and any necessary software for transmitting wireless signals including, for example, data signals, control signals, and signal strength/quality information via one or more wireless connections to other network elements in the wireless communications network.

The receiving unit 354 is a device that includes hardware and any necessary software for receiving wireless signals including, for example, data signals, control signals, and signal strength/quality information via one or more wireless connections to other network elements in the network.

The memory unit 356 may be any device capable of storing data including magnetic storage, flash storage, etc. The memory unit 356 is used for data and controlling signal buffering and storing for supporting pre-scheduling and the scheduled data transmissions and re-transmissions.

The processing unit 358 may be any device capable of processing data including, for example, a microprocessor configured to carry out specific operations based on input data, or capable of executing instructions included in computer readable code.

For example, the processing unit 358 is capable of determining a selected PRACH repetition level and transmitting information to the UE, the information indicating a duration of a timer, the duration indicating a length of time to use the selected PRACH repetition level.

The network interface 360 is a computer hardware component that connects the base station 105 to the computer network. The network interface 360 may connect the base station 105 to a computer network via a wired or wireless connection.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A user equipment (UE) comprising:
   a memory configured to store a selected physical random access channel (PRACH) repetition level;
   a processor configured to,
      monitor a duration of a timer, the duration indicating a length of time to use the stored PRACH repetition level, the processor being configured to perform PRACH access using the stored PRACH repetition level before the timer expires;
   a transmitter configured to transmit the PRACH using the stored PRACH repetition level; and
   a receiver configured to receive a response to the PRACH, the processor being configured to adjust the stored PRACH repetition level based on the response, wherein
      the receiver is configured to receive an indicator of a number of repetitions and the processor is configured to adjust the stored PRACH repetition level based on the indicator, and
      the indicator is an offset relative to a previously stored repetition level and the processor is configured to adjust the stored PRACH repetition level according to the offset.

2. The UE of claim 1, wherein the receiver is configured to receive a broadcast indicating the number of repetitions.

3. The UE of claim 1, wherein the processor is configured to increase the stored PRACH repetition level until the receiver receives the response.

4. The UE of claim 1, wherein the processor is configured to start the timer if the stored PRACH repetition level is adjusted according to the received indicator of the number of repetitions.

5. A method of implementing a physical random access channel (PRACH) repetition level for a user equipment (UE), the method comprising:
   obtaining, by the UE, a selected PRACH repetition level;
   monitoring, by the UE, a duration of a timer, the duration indicating a length of time to use the selected PRACH repetition level;
   performing PRACH access using the selected PRACH repetition level before the timer expires;
   receiving an indicator of a number of repetitions; and
   adjusting the selected PRACH repetition level based on the indicator, wherein the indicator is an offset relative to a previously selected repetition level and the processor is configured to adjust the selected PRACH repetition level according to the offset.

6. The method of claim 5, the receiving includes, receiving a broadcast including the indicator.

7. The method of claim 5, further comprising:
   starting the timer when the selected PRACH repetition level is adjusted according to the received number of repetitions.

8. A method of transmitting a physical random access channel (PRACH) by a user equipment (UE) using a selected repetition level, the method comprising:
   transmitting the PRACH using a first value repetition level;
   obtaining a duration of a timer, the duration indicating a length of time to use the selected repetition level;
   transmitting the PRACH using the selected repetition level;
   determining whether the timer has expired;
   transmitting the PRACH using a second value repetition level as the selected repetition level if the time has not expired; and
   transmitting the PRACH using a third value repetition level as the selected repetition level if the timer has expired.

9. The method of claim 8, wherein the duration of the timer is one of fixed and received by the UE from a base station.

10. The method of claim 8, wherein the second value of repetition level is one of,
    the first value repetition level, and
    a value received by the UE from a base station.

11. The method of claim 8, further comprising:
    determining the first value repetition level, the determining including,
       obtaining a reference signal received power (RSRP) by the UE;
       determining whether the RSRP exceeds a threshold; and
       determining the first value repetition level based on whether the RSRP exceeds a threshold.

12. The method of claim 8, further comprising:
    starting the timer, wherein the timer is started at at least one of,
       a transmission time of the PRACH prior to receiving an acknowledgement,
       receiving an acknowledgement,
       receiving information indicating a length of time of the timer, and
       receiving information indicating a PRACH repetition level.

* * * * *